3,034,956
α,α,α-TRIFLUORO-4-NITRO-METACRESOL SEED PROTECTANTS
Robert G. Baker, Huntington Beach, Calif., assignor to The Dow Chemical Company, Midland, Mich., a corporation of Delaware
No Drawing. Filed May 16, 1960, Ser. No. 29,170
7 Claims. (Cl. 167—38)

The present invention relates to plant husbandry and the raising of crops and is particularly concerned with an agronomical practice and composition for protecting seeds and improving the emergency, seedling growth and harvest of crop plants.

It is an object of the present invention to provide an improved agronomical practice for the raising and protection of seeds and crops. A further object is to provide an improved practice for protecting seeds from the attack of the organisms of seed-rot, root-rot and damping-off. An additional object is the provision of novel compositions adapted to be employed in the new practice in plant husbandry. Other objects will become apparent from the following specification and claims.

The new agronomical practice comprises treating seeds with α,α,α-trifluoro-4-nitro-metacresol or its salts or lower alkyl esters. Such practice protects the seeds and emerging seedlings from the attack of the soil dwelling organisms of damping off, seed-rot and root-rot. The expression "lower alkyl" is employed in the present specification and claims to refer to the alkyl radicals containing from 1 to 4 carbon atoms, inclusive. The salts of α,α,α-trifluoro-4-nitrometacresol such as the alkali metal salts, ammonium salt and alkanol and alkyl amine salts are crystalline solid materials, which are somewhat soluble in a number of common organic solvents and water. α,α,α-Trifluoro-4-nitro-metacresol is a crystalline solid material while its lower alkyl esters, such as those containing up to 4 carbon atoms are liquid materials. α,α,α-Trifluoro-4-nitro-metacresol and its lower alkyl esters are somewhat soluble in many organic solvents and of low solubility in water. The α,α,α-trifluoro-4-nitro-metacresol and its salts and esters are adapted conveniently and readily to be applied to seeds to prevent and protect the seeds from the attack of seed-rot, root-rot and damping-off organisms. Representative materials to be employed in accordance with the present invention include the methyl, ethyl, propyl and butyl esters of α,α,α-trifluoro-4-nitro-metacresol and the salts of α,α,α-trifluoro-4-nitro-metacresol such as the sodium salt, potassium salt, ammonium salt, trimethyl ammonium salt, diethyl ammonium salt, isopropyl ammonium salt, dibutyl ammonium salt, diethanol ammonium salt, propanol ammonium salt, dibutanol ammonium salt and the like.

The application to seeds of at least an effective or microbicidal dosage of the compounds is essential and critical for the practice of the present invention. In general, good results are obtained when the seeds are treated with the compounds at a dosage of from 1/20 to about 1 ounce or more alcohol equivalent of α,α,α-trifluoro-4-nitro-metacresol per hundred pounds of seeds.

The method of the present invention may be carried out by treating the seeds with the unmodified compounds. However, the present method also embraces the employment of liquid or dust compositions containing α,α,α-trifluoro-4-nitro-metacresol or its salts or lower alkyl esters. In such usage, the compounds may be modified with one or more of a plurality of additaments, microbicide or fungicide adjuvants, including solvents or other liquid carriers, surface active dispersing agents and finely divided inert solids. Depending upon the concentration of toxicant, such augmented compositions are adapted to be applied to seeds, or employed as concentrates and subsequently diluted with additional adjuvant or carrier to produce the ultimate treating compositions. The required amount of the compounds conveniently may be applied per hundred pounds of seeds to be treated in from about 1 to 25 ounces of liquid or solid carrier.

The exact concentration of the toxicant compounds to be employed in the treating compositions may vary provided the required fungicidal dosage of the agents are applied to the seeds. The concentration in liquid and dust compositions employed to supply the desired dosage generally is from about 0.1 to 50 percent by weight. In dust, the concentration of the effective agents may be from about 1 to 20 percent by weight. In compositions to be employed as concentrates, the active agents may be present in a concentration of from about 5 to 98 percent by weight.

Liquid compositions containing the desired amount of the active agents may be prepared by dissolving or incorporating the agents in an inert organic liquid such as acetone or carbon tetrachloride, or by dispersing the toxicants in water with or without the aid of a surface active agent. The preferred liquid carriers are those which are adapted to accomplish the distribution of the agents upon the surfaces of seeds and are of such volatility that they evaporate from the treated seed and do not adversely affect germination.

The aqueous compositions to be employed in the present method may contain one or more water immiscible solvents for the active agents. In such compositions, the carrier may comprise an aqueous emulsion, i.e., a mixture of water immiscible solvent, surface active dispersing agent and water. Surface acting agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the compounds are dispersed in and on a finely divided solid such as talc, chalk, gypsum and the like. In such operations, the finely divided carrier is mixed or wet with the toxicant or a solution thereof in a volatile organic solvent. Similarly, dust compositions containing the active agents may be prepared from various of the solid surface active dispersing agents such as bentonite, fuller's earth, attapulgite and other clays. Depending upon the proportion of ingredients, these dust compositions may be employed as concentrations or subsequently diluted with additional solid surface active dispersing agent or with talc, chalk, gypsum and the like to obtain the desired amount of active agent in a composition adapted to be employed for the treatment of seeds. Also, such dust compositions may be dispersed in water to form aqueous seed treating compositions.

The treatment of the seeds may be accomplished by shaking the seed with a dust composition containing the active agents, or by wetting the seeds with a liquid composition prior to planting. In a convenient method of application, the compositions there applied in the form of dusts or sprays to the seeds as they are transported on the surface of a slowly moving belt or a perforated material such as a wire screen.

The ester materials to be employed in accordance with the teachings of the present invention may be prepared in known procedures by reacting together chemically equivalent proportions of α,α,α-trifluoro-4-nitro-metacresol and a lower alkanoic acid halide. Similarly, the salt materials as employed in accordance with the present teachings, may be produced by reacting together in a known manner chemically equivalent proportions of α,α,α-trifluoro-4-nitro-metacresol and an alkali metal hydroxide, ammonium hydroxide, an alkylamine or an alkanolamine.

The following examples merely illustrate the invention and are not to be construed as limiting:

Example 1

α,α,α-Trifluoro-4-nitro-metacresol is dispersed in acetone to prepare a composition containing 40 grams of active ingredient per liter of ultimate mixture. This composition is employed for the treatment of cotton seed to protect the seed from the complex of rot and damping-off organisms. In such operations, cotton seed is uniformly wet with the composition in an amount sufficient to supply 1/16 ounce of the cresol compound per 100 pounds of seed. Following the treatment, the seeds are planted in seed beds of sandy loam soil containing a very heavy infestation of Pythium spp. and Rhizoctonia solani. In a check operation, seed beds of the same infested soil are planted with untreated cotton seeds.

After two weeks, the seed beds are examined to determine the percentage emergence of seedlings. In the seedbeds planted with the treated cotton seeds, there is found an emergence and survival of 85 percent of vigorously growing cotton seedlings. At the time of the observations, there is found a zero percent emergence of cotton seedlings in the check beds planted with untreated cotton seeds.

Example 2

The sodium, potassium and ammonium salts of α,α,α-trifluoro-4-nitro-metacresol are dispersed in acetone to produce compositions containing 40 grams alcohol equivalent of one of the salt compounds per liter of ultimate mixture. These compositions are similarly employed for the treatment of cotton seeds to protect the seeds from the complex of damping-off and rot fungi. The treating and planting operations are all as previously described with the compositions being employed in an amount sufficient to supply 1/8 ounce cresol equivalent of one of the salt compounds per 100 pounds of seed.

After two weeks, observations show emergence of cotton seedlings of 88, 85 and 86 percent in the beds planted with seeds treated with the sodium, potassium and ammonium salts, respectively, of the cresol compound. At the time of the observations, an emergence of zero percent of cotton seedlings is found in the check beds planted with the untreated cotton seeds.

Example 3

Four parts by weight of the triethylammonium salt of α,α,α-trifluoro-4-nitro-metacresol, 16 parts of methanol and 80 parts of water are mixed together to produce a composition in the form of an aqueous solution.

Six parts by weight of the α,α,α-trifluoro-4-nitro-metacresol, 5 parts of a polymerized sodium salt of a substituted benzoid alkyl sulfonic acid (Daxad No. 27) and 89 parts of attapulgite are mechanically mixed and ground together to prepare a composition in the form of a powder.

Similarly, a dust composition is prepared by mixing and grinding together 6 parts by weight of the sodium salt of α,α,α-trifluoro-4-nitro-metacresol and 94 parts of bentonite.

Also, 4 parts by weight of the α,α,α-trifluoro-4-nitro-metacresol ester of acetic acid is dissolved in a petroleum hydrocarbon fraction boiling at from about 312° to about 350° F. and having a flash point of about 116° F. (Stoddard Solvent) to produce a composition in the form of a solvent solution and having a flash point greater than 100° F.

These compositions are adapted to treat the seeds of such plants as cotton, corn, peas, beans, wheat, and peanuts to protect the seeds from the attack of the organism of damping-off and seed and root-rot.

Example 4

One-tenth mole of α,α,α-trifluoro-4-nitro-metacresol is dispersed in 493 milliliters of water and one-tenth mole of triethylamine added portionwise thereto with stirring to produce an aqueous solution containing 40 grams alcohol equivalent of the triethylammonium salt of α,α,α-trifluoro-4-nitro-metacresol per liter of solution.

In a similar fashion, chemically equivalent proportions of various lower alkylamines and lower alkanolamines such as dimethylamine, ethylamine, diisopropylamine, n-butylamine, tri-n-butylamine, triethanolamine, monoethanol diisopropanolamine, monoisopropanol diethanolamine and butanolamine are added with stirring to separate aqueous dispersions of α,α,α-trifluoro-4-nitro-metacresol to produce the respective dimethylammonium, ethylammonium, diisopropylammonium, n-butylammonium, tri-n-butylammonium, ethanolammonium, triethanolammonium, monoethanol diisopropanolammonium, monoisopropanol diethanolammonium and butanolammonium salts of α,α,α-trifluoro-4-nitro-metacresol.

These compositions are similarly employed for the treatment of cotton seeds to protect the seeds from the organisms of damping-off and seed and root-rot. The treating and planting operations are all as previously described with the compositions being employed in an amount sufficient to supply 1/4 ounce alcohol equivalent of one of the salt compounds per 100 pounds of seed.

After two weeks, observations show emergence of cotton seedlings of from 88 to 94 percent in the beds planted with the seed treated with the various salt compounds. At the time of the observations, an emergence of one percent of cotton seedlings is found in the check beds planted with untreated cotton seeds.

Example 5

0.11 mole of α,α,α-trifluoro-4-nitro-metacresol is added to 0.11 mole of acetyl chloride dispersed in 300 milliliters of ethylene dichloride and the resulting mixture heated at the boiling temperature for about 2 hours. The heating is carried out with the continuous distillation of ethylene dichloride and hydrogen chloride of reaction and the recycling of the ethylene dichloride. Following the heating period, the reaction mixture is washed with dilute aqueous sodium carbonate and the washed product diluted with 200 milliliters of acetone. The resulting solution contained about 40 grams alcohol equivalent of the a,a,a-trifluoro-4-nitro-metacresol ester of acetic acid per liter of solution.

In an exactly comparable manner, 0.11 molecular proportion of propionyl chloride and butyryl chloride are separately reacted with 0.11 molecular proportions of a,a,a-trifluoro-4-nitro-metacresol to prepare solutions containing 10 grams alcohol equivalent of the a,a,a-trifluoro-4-nitro-metacresol esters of propionic acid and of butyric acid per liter of solution.

These ester compositions are employed in the previously described manner for the treatment of cotton seeds for their protection against the attack of the organisms of damping-off, seed-rot and root-rot. In these operations, the seeds are treated with the compositions in an amount sufficient to supply 1/4 ounce alcohol equivalent of one of the ester compounds per 100 pounds of seed. After two weeks, the seedbeds are examined and an emergence of cotton seedlings of from 88 to 94 percent observed in the beds planted with seeds treated with the various ester compounds. At the time of observation, an emergence of zero per cent of cotton seedlings is found in the check beds planted with untreated cotton seeds.

I claim:

1. In a method of increasing the resistance of seeds to attack by the soil inhabiting organisms of damping off, seed rot and root rot, the step which comprises treating seeds with a microbicidal amount of an active agent selected from the group consisting of a,a,a-trifluoro-4-nitro-metacresol and its lower alkyl esters and sodium, potassium, ammonium, lower alkyl amine and lower alkyl amine salts.

2. A method for protecting seeds from the attack of the soil inhabiting organisms of damping off, seed rot and root rot which comprises treating the seeds with a microbicidal amount of a composition comprising an active agent in admixture with an inert adjuvant as a carrier, the active agent being selected from the group consisting of a,a,a-trifluoro-4-nitro-metacresol and its lower alkyl esters and sodium, potassium, ammonium, lower alkyl amine and lower alkyl amine salts.

3. In a method of increasing the resistance of seeds to attack by the soil inhabiting organisms of damping off, seed rot and root rot, the step which comprises treating seeds with a microbicidal amount of a,a,a-trifluoro-4-nitro-metacresol.

4. In a method of increasing the resistance of seeds to attack by the soil inhabiting organisms of damping off, seed rot and root rot, the step which comprises treating seeds with a microbicidal amount of the sodium salt of a,a,a-trifluoro-4-nitro-metacresol.

5. In a method of increasing the resistance of seeds to attack by the soil inhabiting organisms of damping off, seed rot and root rot, the step which comprises treating seeds with a microbicidal amount of the potassium salt of a,a,a-trifluoro-4-nitro-metacresol.

6. In a method of increasing the resistance of seeds to attack by the soil inhabiting organisms of damping off, seed rot and root rot, the step which comprises treating seeds with a microbicidal amount of the triethyl-ammonium salt of a,a,a-trifluoro-4-nitro-metacresol.

7. In a method of increasing the resistance of seeds to attack by the soil inhabiting organisms of damping off, seed rot and root rot, the step which comprises treating seeds with a microbicidal amount of a,a,a-trifluoro-4-nitro-metacresol ester of acetic acid.

References Cited in the file of this patent

UNITED STATES PATENTS 2,489,423　　Lawson _____ Nov. 29, 1949

OTHER REFERENCES

Horsfall: Fungicides and Their Action, vol. II, 1945, p. 151.

King: U.S. Dept. Agr. Handbook, No. 69, 1954, pp. 122, 123.